May 17, 1932.    C. HAMBUECHEN    1,858,445
RECTIFIER
Filed March 31, 1930
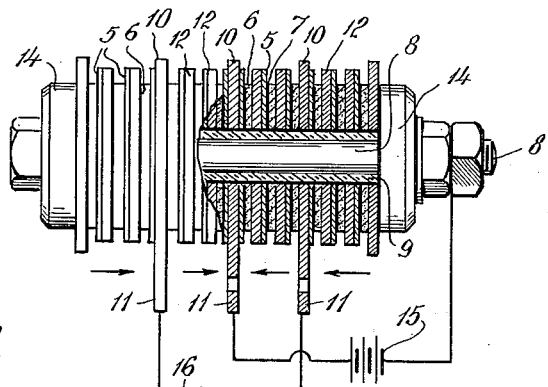
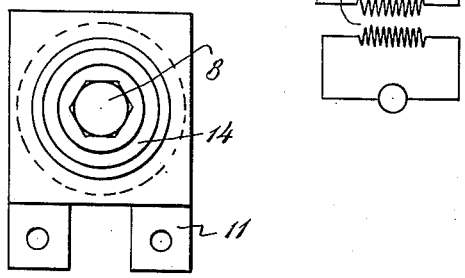
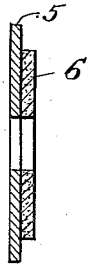
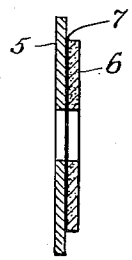
INVENTOR
CARL HAMBUECHEN
BY
Pennie, Davis, Marvin & Edmonds
ATTORNEYS Patented May 17, 1932

1,858,445

UNITED STATES PATENT OFFICE

CARL HAMBUECHEN, OF BELLEVILLE, ILLINOIS, ASSIGNOR TO THE B-L ELECTRIC MANUFACTURING COMPANY, OF ST. LOUIS, MISSOURI, A CORPORATION OF MISSOURI

RECTIFIER

Application filed March 31, 1930. Serial No. 440,635.

This invention relates to dry contact rectifiers.

In the patent to Pawlowski No. 834,924 there is described and claimed a rectifier for alternating current consisting of plates or discs of electro-positive metals and electro-negative metals arranged in contact with each other. The asymmetrical couples so formed depend for their action on the presence of a rectifying or bonding material between the electrode elements. Various methods for forming this rectifying and bonding material have been proposed. In the Ruben Patent No. 1,649,741 the electro-positive element is coated with a sulphide (or hydroxide) by placing it in a bath of an alkaline sulphide and connecting it as the anode in a current path through the sulphide solution to a suitable cathode electrode such as brass or nickel.

In my prior application Serial No. 333,032, filed January 16, 1929, I have disclosed and claimed a method of forming the rectifying and bonding material between the electrodes by first forming a completed cell or rectifier and then dipping it in water whereby the widely divergent electrodes are arranged in a short circuited relation setting up a battery action which causes a current to flow between them. This results in the liberation of hydrogen sulphide by the action on the electro-negative sulphide element and forms a rectifying and bonding material by the partial disintegration of the electrodes.

I have found that better results can be obtained when a rectifying bond or flux is applied to the surface of the electro-negative electrode than when it is applied to the electro-positive electrode as in the processes of the prior art. My process also possesses important operating advantages over these prior processes referred to above.

In carrying out my invention I may form the rectifying bond by electrolytic means or by spraying or otherwise applying a solution of the desired material to the surface of the electro-negative electrode element. Thus, when the elements of the rectifier consist of cuprous sulphide and magnesium, the reaction product formed by dipping them in water is a mixture of magnesium hydroxide and disintegrated or reduced cuprous sulphide. I have found that if the electro-negative electrode element is coated with a salt of an electro-positive electrode element, which is in the nature of a flux a very desirable rectifying bond is formed between the elements. I accordingly propose to use a magnesium chloride solution in coating the electro-negative electrode element. The magnesium chloride in the form of a solution having a density of substantially 1.180 may be employed or I may employ a magnesium chloride solution containing a suspension of magnesium oxide, or a magnesium chloride solution having a suspension of a mixture of magnesium oxide and finely powdered copper sulphide in the solution.

The rectifying and bonding material may be applied to the copper sulphide washers either by spraying or otherwise mechanically applying it to the surface or by an electrolytic treatment. The sulphide washers are placed in a solution of magnesium chloride, or a solution of magnesium chloride containing a suspension of magnesium oxide, or a suspension of magnesium oxide and finely powdered copper sulphide and a current of 1 ampere is passed through the solution for two or three minutes. The washer is then taken out and then allowed to dry. In the electric bath a scum forms on the surface of the washer and when these washers are assembled with electro-positive electrode elements in the manner disclosed in the Pawlowski patent, immediate rectification takes place without any preliminary forming of the rectifier.

Instead of forming the rectifying and bonding material electrolytically the copper sulphide washers may be coated by spraying. Any suitable apparatus may be employed for this purpose. The magnesium chloride solution, with or without the suspension of magnesium oxide or magnesium oxide and powdered copper sulphide is sprayed on to the polished surface of the copper sulphide washers and the washers allowed to stand and dry for a period of ten or twelve hours. I have found that the magnesium chloride will crystallize on the surface of the copper sulphide or react with it to form a green compound over the entire surface of the copper sulphide washer. The greenish compound is formed when the copper sulphide washers are formed essentially of cuprous sulphide whereas when the copper sulphide washers are formed of cupric sulphide, I find that no reaction takes place between the copper sulphide and the magnesium chloride and the magnesium chloride merely crystallizes on the surface of the washers. The cuprous sulphide washers containing the green reaction product between the cuprous sulphide and magnesium chloride give the best results as rectifier elements. After the washers have been allowed to dry for a period of ten to twelve hours, they may be assembled directly into rectifiers with a pressure of several tons and immediate rectification obtained. When magnesium chloride, either with or without the suspension of magnesium oxide or magnesium oxide and finely divided copper sulphide is employed to form the rectifying and bonding material on the copper sulphide washers, the rectifying elements so formed are used in conjunction with electro-positive electrode elements, such as aluminum. While the above process has been described particularly in connection with magnesium chloride other inorganic salts may be employed in its place. Magnesium chloride is selected as perhaps the best rectifying and bonding agent due to the fact that it decomposes into magnesium oxychloride which is a good cementing agent and which will therefore function to best advantage in use as a rectifying and bonding material, but solutions of other salts, such as copper sulphate, calcium chloride or potassium chlorate may be substituted for the magnesium chloride. The magnesium oxide is added to the magnesium chloride solution to facilitate moistening the entire surface of the copper sulphide washer. Where magnesium chloride is employed alone, I have found that, in some instances, it is difficult to completely moisten the entire surface of the copper sulphide washer with the solution and the magnesium oxide is added to facilitate moistening, otherwise only part of the surface of the washer is covered with the rectifying and bonding material and the efficiency of the rectifier is proportionally reduced. The addition of the copper sulphide to the solution assists in carrying out the reaction between the magnesium chloride and the copper sulphide washer.

In another form of the invention I employ a mixture of magnesium chloride and copper carbonate. By adding the copper carbonate to the magnesium chloride solution I have found that the resulting coating is not dependent on the character of the sulphide and that with washers of either cuprous sulphide or cupric sulphide substantially the same results will be obtained. The mixture of magnesium chloride and copper carbonate can be applied to the surface of the copper sulphide washers either electrolytically as heretofore described or by mechanical means such as by spraying. A solid coating is formed on the copper sulphide washers and after drying the washers will function efficiently as electro-negative electrode elements regardless of whether cuprous or cupric sulphide washers are employed. Furthermore, the washers will function in connection with electro-positive electrode elements of magnesium, aluminum or zinc.

In the acompanying drawings I have illustrated a rectifier constructed in accordance with the invention. In this showing, Fig. 1 is a side elevation, parts being shown in section, illustrating the elements assembled in the well known Gratz or bridge arranged to give full wave rectification;

Fig. 2 is an end view of the rectifier;

Fig. 3 is a sectional view of a couple without the bonding surface of the present invention; and Fig. 4 is a similar view of a couple showing the bonding surface applied to the electro-negative electrode element.

As shown in the drawings, each couple comprises an electro-positive element 5. As stated, this element may be formed of magnesium, aluminum or zinc. The couple also comprises an electronegative element 6 formed of copper sulphide and provided with a bonding surface 7 formed in the manner described above. The elements, of course, may be of any desired shape but are illustrated in the conventional form of circular washers. In the assembled rectifier, shown in Fig. 1, the couples are assembled on a bolt 8 from which they are insulated by means of a tube 9 of fiber or other suitable insulating material. Heat radiation plates 10, having terminal projections 11, divide the assembly into four sections. Current is adapted to flow through the sections in the directions indicated by the arrows in Fig. 1. The number of couples in each section is dependent upon the voltage at which the device is intended to operate. Suitable metallic washers 12 are disposed between the adjacent couples, the washers being formed of any suitable material, such as brass. The couples and washers are clamped together under the dedsired pressure between metal collars 14. The bolt and the center-most plate 10 form the D. C. terminals of the devivce and in the drawings I have illustrated them connected to a battery 15. The other terminals, or the A. C. terminals, may be connected to a transformer conventionally illustrated at 16.

I claim:

1. An electric current rectifier of the dry type comprising a copper sulphide electrode element having a bonding surface of an inorganic salt of an electro-positive metal, and an electro-positive electrode element of aluminum, magnesium or zinc contacting with said surface.

2. An electric current rectifier of the dry type comprising an electro-negative electrode element of copper sulphide having a bonding surface of magnesium chloride, and an electro-positive electrode element of aluminum, zinc or magnesium contacting with said surface.

3. An electric current rectifier of the dry type comprising an electro-negative electrode element of copper sulphide having a bonding surface of magnesium chloride and copper carbonate, and an electro-positive electrode element of aluminum, magnesium or zinc contacting with said surface.

4. An electric current rectifier of the dry type comprising a copper sulphide electrode element having a bonding surface of magnesium chloride, and an aluminum electrode element contacting with said surface.

5. The process of making electro-negative electrode elements for dry contact rectifiers which comprises covering the surface of an electro-negative electrode element with magnesium chloride.

6. The process of making electro-negative electrode elements for dry current rectifiers which comprises covering the surface of copper sulphide with magnesium chloride.

7. The process of making electro-negative electrode elements for dry contact rectifiers which comprises covering the surface of a copper sulphide electro-negative electrode element with magnesium chloride and copper carbonate.

8. The process of making electro-negative electrode elements for dry current rectifiers which comprises spraying a solution of magnesium chloride on the surface of a copper sulphide electrode element and permitting it to dry.

9. The process of making electro-negative electrode elements for dry current rectifiers which comprises spraying a solution of magnesium chloride and copper carbonate on the surface of a copper sulphide electrode element and permitting it to dry.

In testimony whereof I affix my signature.

CARL HAMBUECHEN.